Jan. 18, 1955   B. A. WITTKUHNS ET AL   2,699,750
MACHINE FOR COATING CONTAINERS
Filed April 26, 1951   5 Sheets-Sheet 1
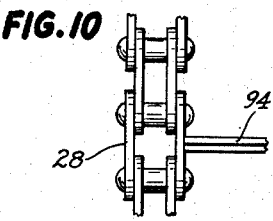
FIG. 10
FIG. 9
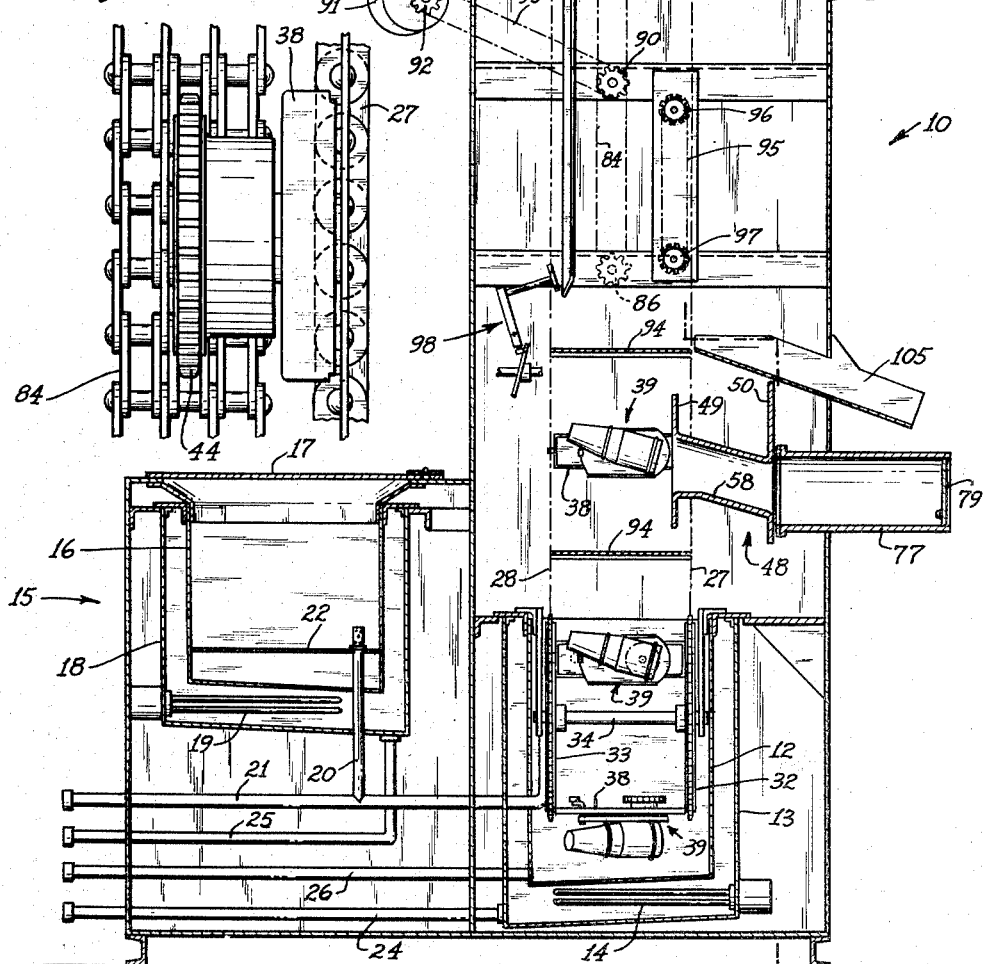
FIG. 1
INVENTOR.
BRUNO A. WITTKUHNS
GILBERT F. HILL
BY
ATTORNEY Jan. 18, 1955

B. A. WITTKUHNS ET AL 2,699,750

MACHINE FOR COATING CONTAINERS

Filed April 26, 1951

INVENTOR.
BRUNO A. WITTKUHNS
GILBERT F. HILL
BY
ATTORNEY

Jan. 18, 1955     B. A. WITTKUHNS ET AL     2,699,750
MACHINE FOR COATING CONTAINERS
Filed April 26, 1951     5 Sheets-Sheet 3
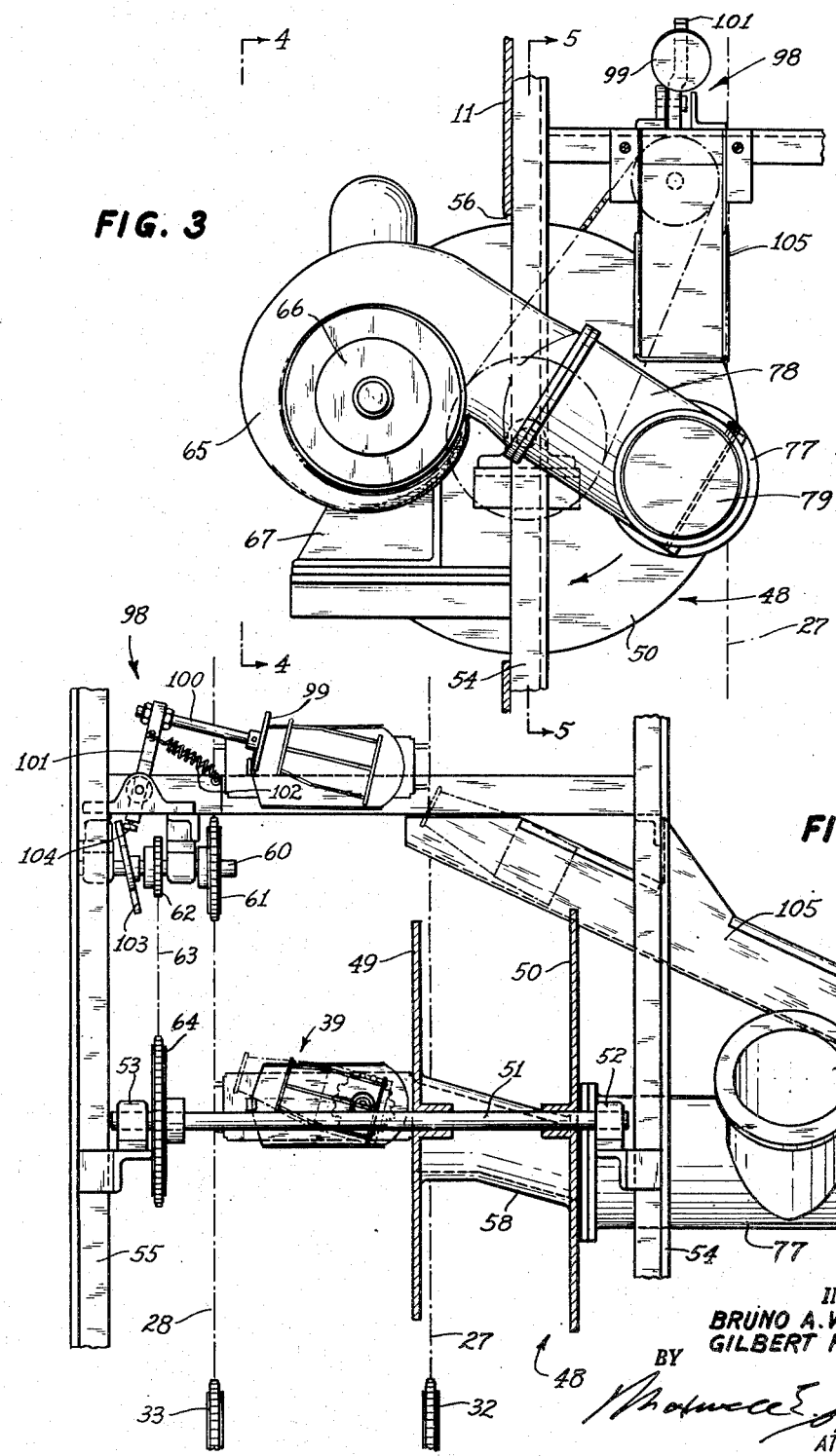
INVENTOR.
BRUNO A. WITTKUHNS
GILBERT F. HILL
BY
ATTORNEY

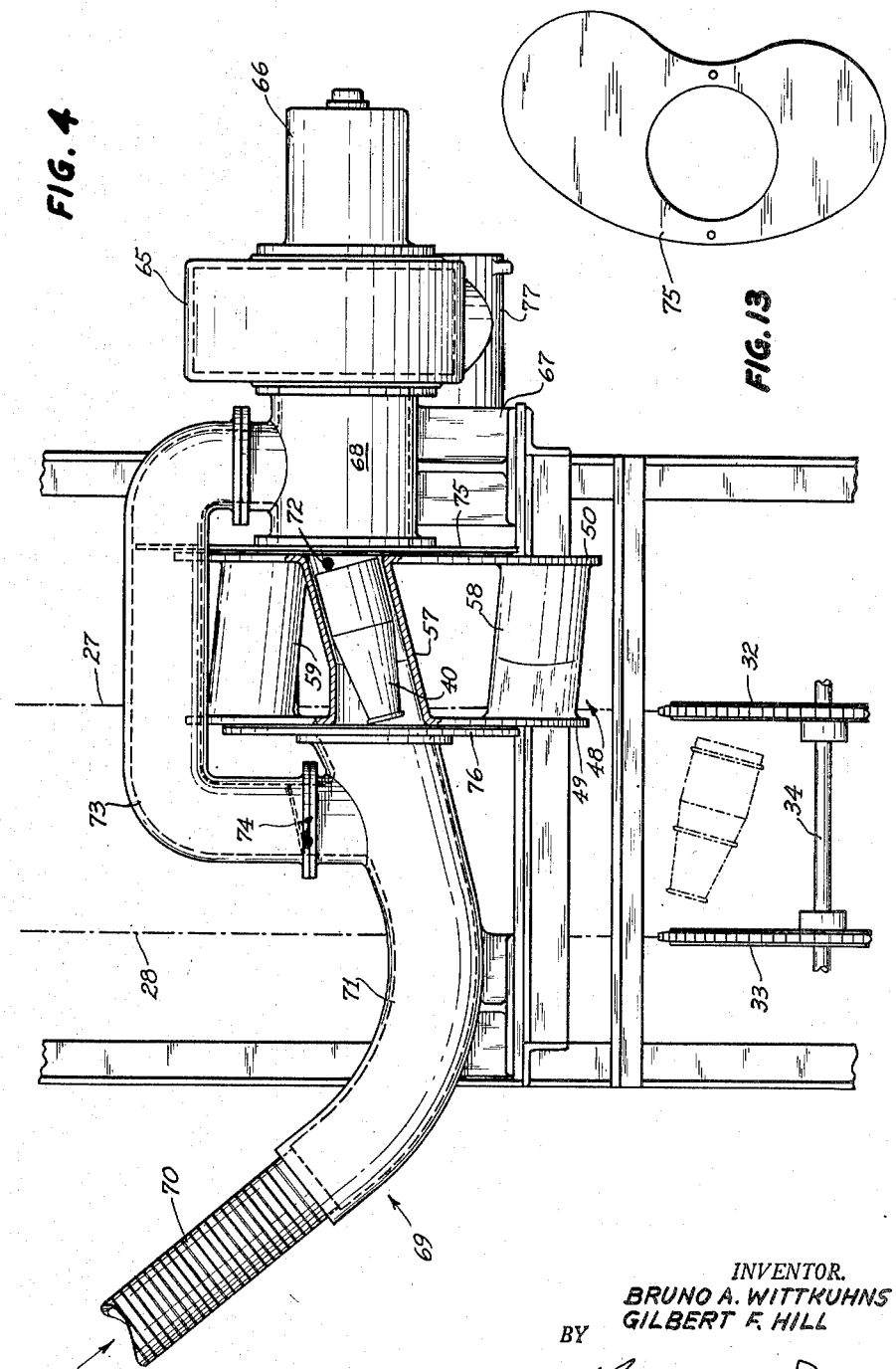

Jan. 18, 1955 B. A. WITTKUHNS ET AL 2,699,750
MACHINE FOR COATING CONTAINERS
Filed April 26, 1951 5 Sheets-Sheet 5

INVENTOR.
BRUNO A. WITTKUHNS
GILBERT F. HILL
BY
ATTORNEY

2,699,750

MACHINE FOR COATING CONTAINERS

Bruno A. Wittkuhns, Summit, and Gilbert F. Hill, Madison, N. J., assignors to National Paper Bottle Co. Inc., New York, N. Y., a corporation of New York Application April 26, 1951, Serial No. 223,012

13 Claims. (Cl. 118—52)

The present invention relates to machines for coating containers, and particularly to a machine for applying a coating of paraffin to bottle-shaped paper containers.

An object of the present invention is to provide a machine for automatically applying a paraffin coating of uniform thickness to bottle-shaped paper containers so that the latter are conditioned to receive milk or other free flowing materials.

Another object of the present invention is to provide a machine for coating containers which includes a chamber having a bath of molten paraffin at the bottom thereof, and a conveyor having container receiving baskets thereon arranged to carry containers downwardly into the paraffin bath with the axis of each container inclined so that the mouth end thereof is uppermost to facilitate the entry of paraffin into the interior of the submerging container and to raise the coated containers from the paraffin both with the axis of each container oppositely inclined so that the mouth end thereof is lowermost to thereby permit draining of the paraffin from the interior of the container as the latter is removed from the bath.

Another object is to provide a machine of the described character which includes a conveyor having container receiving baskets thereon for carrying containers into and out of a bath of molten paraffin, and has automatic mechanism for depositing a container in each basket as the latter moves past a loading station in the direction toward the paraffin bath and for removing or ejecting the coated container from its receiving basket after the paraffin coating has dried.

Another object resides in the provision of a machine of the described character which includes a tower structure defining a chamber having a bath of molten paraffin at the bottom thereof, a conveyor having container receiving baskets thereon movable in the chamber to carry the baskets successively into and out of the paraffin bath, a rotatable loading turret extending into the chamber from the outside of the tower structure to receive containers successively at the outside of the tower structure and to carry such containers into the chamber for loading into the baskets on the conveyor, a conveyor tube extending to the loading turret outside of the tower structure to supply containers to the loading turret, driving mechanism for the loading turret to operate the latter in synchronism with the movement of the conveyor, and pneumatic means operatively associated with the loading turret for drawing the containers from the conveyor tube into the loading turret and for ejecting the containers from the loading turret into the baskets within the chamber as such baskets successively move past the loading turret.

Another object is to provide a machine of the described character for applying a paraffin coating to containers which includes a tower structure defining a vertically extending chamber having a bath of molten paraffin at the bottom thereof, a continuous conveyor in the tower having container receiving baskets thereon to successively carry containers downwardly into the paraffin bath and then to raise the coated containers from the bath, and a central wall in the tower structure separating the downwardly and upwardly moving runs of the conveyor and extending at its lower end below the level of the bath of molten paraffin so that the coated containers are raised through a passageway having a fluid seal at the bottom and heated at least in part, by the molten paraffin to thereby retard the setting of the paraffin coating and permit the removal of the excess paraffin from the coated containers.

A further object is to provide a machine of the described character for applying a paraffin coating to paper containers, wherein the containers are supported in baskets mounted on a continuous conveyor for movement into and out of a bath of molten paraffin, and including mechanism for automatically whirling the container supporting baskets after their withdrawal from the bath of molten paraffin to thereby remove the excess paraffin from the coated containers supported therein.

A further object is to provide a machine of the described character for coating bottle-shaped paper containers having tapered neck portions which includes a conveyor movable into and out of a bath of molten paraffin and having spaced apart container receiving baskets rotatably mounted thereon, each of the baskets being formed to permit axial insertion of a container with the tapered neck portion of the latter foremost and to prevent further axial movement of the inserted container in the direction in which the container opens, and the axis of rotation of the container receiving basket relative to the conveyor is arranged so that the centrifugal force acting on the container, when its supporting basket is whirled, will tend to move the container axially in the direction in which the latter opens to thereby throw out the excess paraffin as well as to more securely wedge the container in its supporting basket.

A still further object of the present invention is to provide a machine of the described character including a continuous conveyor having rotatable container receiving baskets thereon in spaced apart arrangement, the conveyor following a downwardly moving path extending into a bath of molten paraffin and an upwardly moving path extending out of the paraffin bath, mechanism located adjacent the lower portion of the downwardly moving path of the conveyor to insert containers into the baskets as the latter move successively thereby, means operative to normally lock each of the baskets non-rotatably on the continuous conveyor, releasing means arranged along the upper portions of the upwardly and downwardly moving paths of the continuous conveyor operative to release the locking means of each basket as the latter passes along such upper portions of the paths, means arranged along the upper portions of the paths operative to whirl the released baskets moving therealong, means arranged along the upper portion of the downwardly moving path following the whirling means associated with that path to brake the rotation of the released baskets after disengagement of the latter from the whirling means, and mechanism located adjacent the downwardly moving path of the conveyor, between the braking means and the container inserting mechanism, operative to discharge the coated containers from the supporting baskets as the latter move thereby and thus to condition the successive baskets for the reception of containers at the following container inserting mechanism.

These and other objects, features and advantages of the present invention will be apparent as the following detailed description of a preferred embodiment proceeds, with that preferred embodiment being illustrated in the accompanying drawings wherein:

Fig. 1 is a vertical sectional view of a machine for applying a paraffin coating to paper containers according to the present invention and taken along the line 1—1 of Fig. 2;

Fig. 3 is an end elevational view, on an enlarged scale, of loading and discharging mechanisms forming part of the machine of Figs. 1 and 2, with portions of the housing of the machine removed for the purpose of clarity;

Fig. 4 is a side elevational view of the loading mechanism of Fig. 3 as seen when viewed along the line 4—4 of Fig. 3, and with portions of that mechanism broken away and in section;

Fig. 5 is a vertical sectional view of the loading and discharging mechanisms taken along the line 5—5 of Fig. 3;

Fig. 9 is a fragmentary elevational view, on an enlarged scale, showing the engagement of a sprocket on the basket assembly with a whirling chain and viewed in the same direction as in Fig. 2;

Fig. 10 is a fragmentary, elevational view, on an enlarged scale, showing the mounting of a baffle or deflector plate on a coveyor chain forming part of the machine of Figs. 1 and 2, with the parts being viewed in the same direction as in Fig. 1;

Fig. 13 is an elevational view of an element forming a part of the machine in Figs. 1 and 2.

Figure 2:
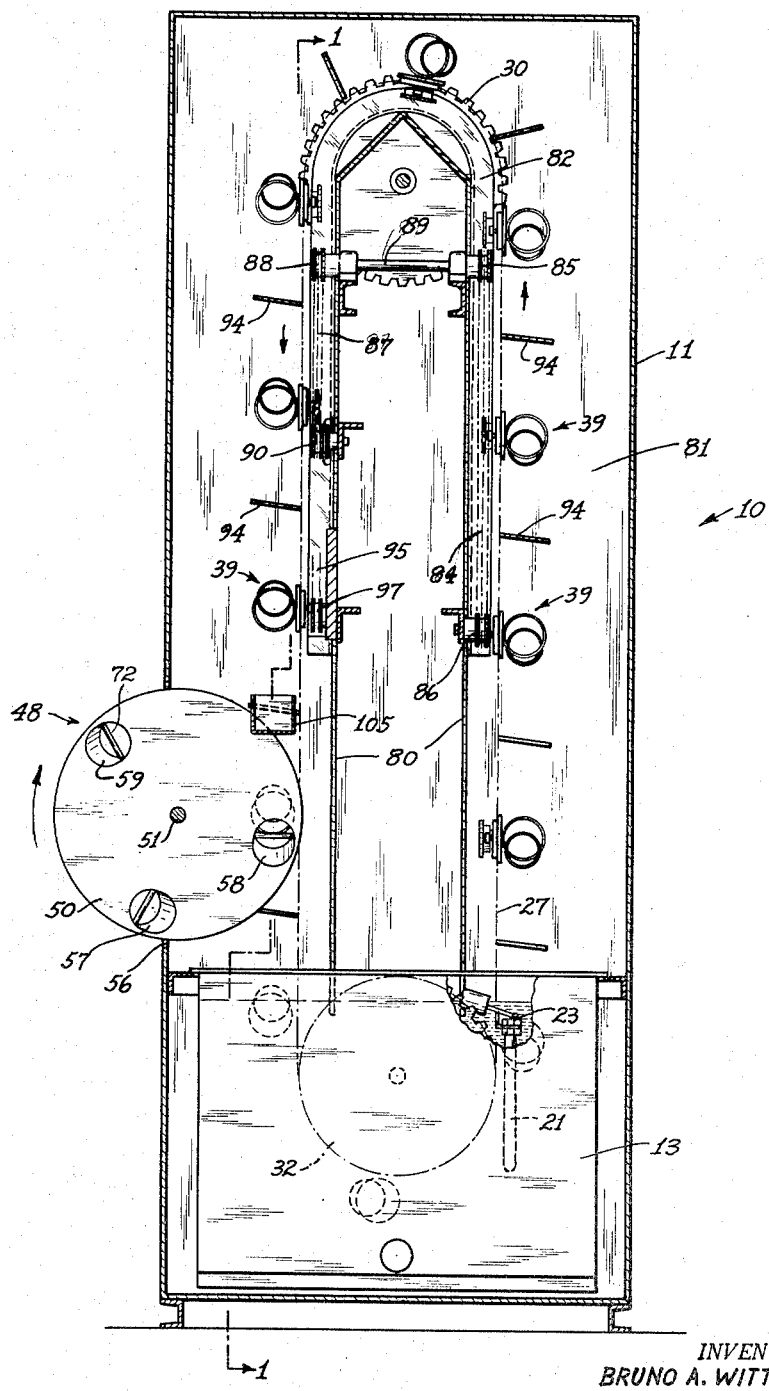
Fig. 2 is a vertical sectional view of the machine in Fig. 1 and taken along the line 2—2 of Fig. 1.

Referring to the drawings in detail, and initially to Figs. 1 and 2 thereof, a machine, generally indicated by the reference numeral 10 and constructed according to an embodiment of this invention, is there shown and includes assemblies constructed and cooperatively arranged to automatically apply a uniform paraffin, or other, coating to the internal and external surfaces of containers to receive milk or other free flowing materials.

The machine 10 includes a vertical tower structure or housing 11 provided with suitable internal framing and preferably encased in a heat insulating sheath or casing (not shown). An upwardly opening container 12, forming a reservoir for holding a bath of molten paraffin, is supported in the lower portion of the tower 11 and fits into a larger container 13, of similar shape, so that a space is provided between the inner and outer containers 12 and 13, respectively, to receive a heating medium, preferably oil, for maintaining the paraffin in the reservoir 12 in a molten condition. Heaters 14, preferably of the electrical resistance type, extend into the space between the reservoir 12 and outer container 13 for heating the oil in that space. Since it is desirable to maintain the temperature of the paraffin in the reservoir 12 substantially constant while coating the containers which are dipped therein, as will hereinafter appear, the supply of paraffin in the reservoir is replenished, as needed, from a paraffin loading unit 15 preferably disposed in a lateral extension of the lower portion of the tower 11, wherein the solid paraffin is melted down and heated to the desired temperature before being conducted to the dipping reservoir 12. The paraffin loading unit 15 includes an upwardly opening, paraffin receiving tank or reservoir 16 having a removable cover 17 and fitting into a similarly shaped container or tank 18 of larger dimensions to provide a space therebetween for receiving oil or any other like heating medium. Heaters 19, preferably of the electrical resistance type, extend into the space between the tanks 16 and 18 to heat the medium in that space and thereby melt the solid paraffin placed in the loading tank 16. The loading tank 16 is communicated with the dipping reservoir or tank 12 by a pipe 20 joined to a conduit or pipe 21 extending into the dipping reservoir or tank. As seen in Fig. 1, a perforated false bottom 22 is provided in the loading tank to permit settling of the foreign particles that may be included in the solid paraffin loaded into the unit 15 and the pipe 20 opens into the loading tank 16 above this perforated wall and is preferably provided with a strainer at its open end so that only unadulterated paraffin is transported to the dipping tank or reservoir. As seen in Fig. 2, a float controlled valve 23 is provided at the outlet of the pipe 21 opening into the dipping tank or reservoir 12 so that the level of the molten paraffin in the latter is maintained substantially constant. The oil containing outer tanks 13 and 18 have drain pipes 24 and 25, respectively, opening at the bottoms thereof, and a drain pipe 26 is provided for the dipping tank 12, with each of the aforementioned pipes or conduits preferably having an associated control valve, not shown, to selectively control the flow of paraffin or oil, as the case may be, therethrough. In the event that a suitable supply or source of molten paraffin is available for feeding to the dipping tank or reservoir 12, the loading unit 15, intended for preparing solid paraffin for use, may be eliminated and the supply of molten paraffin fed directly to the dipping tank through a suitable float controlled valve, such as the illustrated valve 23.

The machine 10 has a continuous conveyor movable within the tower or housing 11 for carrying successive containers downwardly into the bath of molten paraffin in the dipping tank or reservoir 12 and then for removing the coated containers upwardly from the paraffin bath. The continuous conveyor referred to above includes two spaced apart, parallel, continuous chains 27 and 28 trained over sprockets 29 and 30, respectively, fixed on a shaft 31 which is journalled in suitable bearings supported adjacent the top of the tower 11, and over sprockets 32 and 33, respectively, which are fixed on a shaft 34 journalled in suitable bearings supported within the dipping tank 12 at the bottom of the tower 11. The conveyor is preferably driven by an electric motor 35 (Fig. 1), having a speed reducer associated therewith, which is mounted on a cross-member 36 of the tower and is operatively connected to the shaft 31 by a suitably proportioned sprocket and chain drive 37. Thus, one vertical run of the chains 27 and 28 will travel downwardly into the dipping tank 12 while the other vertical run of each conveyor chain will travel upwardly from the dipping tank. In order to support the containers on the conveyor for movement into and out of the dipping tank, equally spaced apart support brackets 38 (Figs. 1, 6 and 7) extend between the chains 27 and 28 to rotatably support container receiving basket assemblies, generally indicated by the numeral 39.

Figure 6:
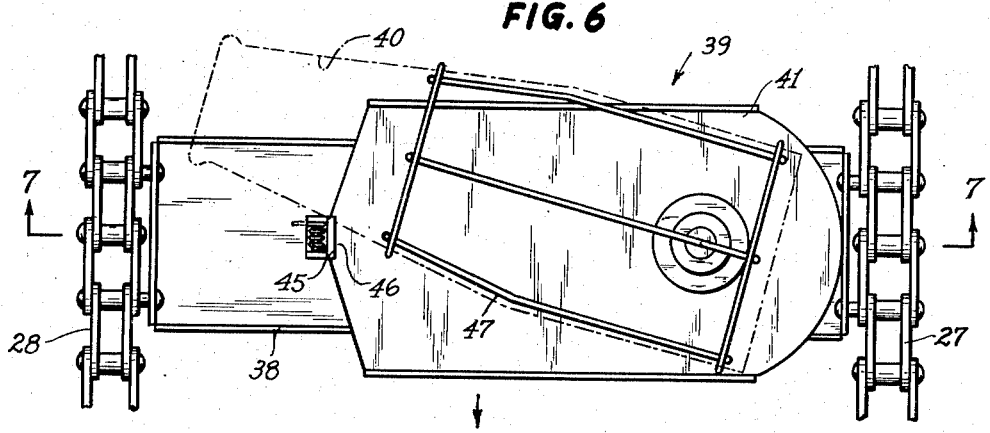
Fig. 6 is a plan view of a basket assembly for receiving the containers to be coated and forming a part of the machine of Figs. 1 and 2, and shown on an enlarged scale.
Figure 7:
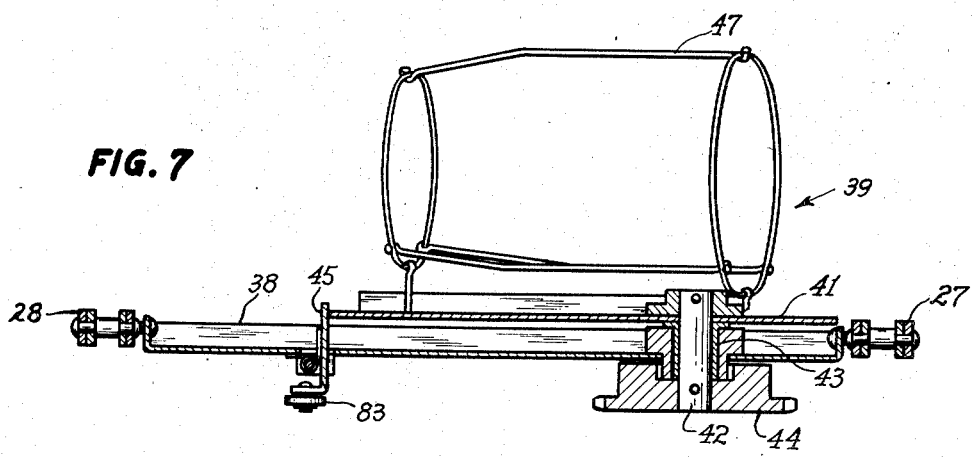
Fig. 7 is a sectional view of the basket assembly taken along the line 7—7 of Fig. 6.

Each basket assembly 39 is formed to receive a bottle-shaped paper container of the form and type produced by the container forming machines disclosed in United States Letters Patent No. 2,642,784, issued June 23, 1953; No. 2,642,785, issued June 23, 1953; and No. 2,674,929, issued April 13, 1954; and in the copending application Serial Number 223,011, filed April 26, 1951. Each paper container produced by the machines provided in the above identified applications, and shown in broken lines in Fig. 6 hereof, includes a cylindrical body portion and a truncated conical contiguous neck portion tapering toward the mouth end of the container. The basket assembly 39 for receiving and supporting such a paper container includes a platform 41 mounted on the bracket 38 for rotation in a plane in front of and substantially parallel to the bracket 38 and about an axis disposed adjacent one end of the platform. The rotatable mounting of platform 41 on the bracket 38 is achieved by a shaft 42 (Fig. 7) fixed to the platform 41 and extending rotatably through a bearing 43 carried by the bracket 38. A sprocket 44 is fixed to the shaft 42 at the end of the latter extending to the rear of the bracket for a purpose that will hereinafter appear. In order to normally hold the platform 41 non-rotatable relative to the bracket 38, the latter pivotally carries a rockable latch member 45 which is spring urged radially into a suitable notch 46 formed in the free end of the platform 41. A basket 47 is mounted fixedly on the platform 41 and includes two circular bent wire rings of different diameter spaced apart in concentric, parallel relationship by suitably bent longitudinal stays or spreaders. As seen in Fig. 6, the larger of the bent wire rings is dimensioned to extend around the cylindrical body portion of the container 40 while the smaller of the wire rings has a diameter smaller than that of the cylindrical portion of the container to engage around the truncated conical neck part of the latter. Thus, the container may be inserted into and removed from the basket 47 through the larger wire ring of the latter, while the smaller ring limits the axial movement of the container into the basket. The basket 47 is arranged on the platform 41 so that the concentric axes of the bent wire rings thereof are inclined relative to the normal or perpendicular line between the chains 27 and 28, when the platform is in its latched condition (Fig. 6). Assuming the movement of the conveyor chains 27 and 28 to be in the direction of the arrow on Fig. 6, it will be noted that the inclination of the axes, referred to above, is away from the direction of movement of the conveyor chains so that the smaller ring trails the larger ring. Thus, the mouth end of a container 40 mounted in the basket 47 trails the base end of the container as the conveyor carries the container downwardly into the bath of molten paraffin in the dipping tank 12 and then upwardly out of the dipping tank.

This inclined arrangement of the container receiving baskets 47, when in the latched condition, improves the filling and draining of the container when it is dipped into, and then removed from, the paraffin bath. Thus, when the container is being submerged, the mouth end thereof is uppermost and the air in the container may escape from the upper portion of the mouth while the molten paraffin enters the interior of the container at the bottom of the mouth. In this manner, the submerged container is fully and quickly filled with paraffin, and no air can be trapped within the container. When the container is withdrawn upwardly from the bath of molten paraffin, the mouth end of the container is lowermost to thereby insure complete draining of the excess paraffin from the interior of the container.

In order to insert containers into the successive baskets 47 as the latter pass along the downwardly moving run of the conveyor, a loading turret assembly, generally indicated by the reference numeral 48, is provided to receive the containers at the outside of the tower 11 and to carry such containers into the tower for projection into the baskets as the latter successively pass by a loading station. The turret assembly includes two circular discs 49 and 50 mounted in spaced apart, parallel and concentric relationship (Figs. 3, 4 and 5) on a shaft 51 which is journalled in suitable bearing blocks 52 and 53 carried by frame uprights 54 and 55, respectively, of the tower structure 11 (Fig. 5) so that the shaft 51 rotates about a horizontal axis lying in a vertical plane parallel to the plane of movement of the downwardly traveling runs of the conveyor chains 27 and 28. As seen in Figs. 2, 3 and 5, the loading turret assembly 48 is arranged so that the disc 49 thereof is substantially tangential, at its periphery, to the vertical plane of the downwardly moving runs of the conveyor chains 27 and 28, and rotates in a plane passing by the end of the baskets 47 having the larger wire rings as the latter move along the downwardly traveling runs of the conveyor chains. As seen in Figs. 2 and 3, the turret assembly 48, when thus supported for rotation extends from inside the tower 11 to the outside of the latter through a suitably formed opening 56 provided in the side wall of the tower. The turret assembly 48 is completed by a plurality of open-ended loading tube members, in the illustrated embodiment the three tube members 57, 58 and 59 (Figs. 2 and 4), fixed between the discs 49 and 50, as by welding, or formed integrally therewith, and opening at their opposite ends through suitable openings formed in the peripheral portions of the discs. The tube members 57, 58 and 59 are arranged in equally circumferentially spaced apart relationship, with the longitudinal axis of each tube member being inclined relative to the axis of rotation of the shaft 51 so that such longitudinal axis extends substantially parallel to the concentric axes of the wire rings of a basket on the downwardly moving runs of the conveyor chains when the tube member being considered is, for example, the tube member 58 in Fig. 5, in the innermost position or loading station within the tower 11.

The turret assembly 48 is rotated in synchronism with the movement of the conveyor chains 27 and 28, and in a clockwise direction as viewed in Figs. 2 and 3, so that the successive loading tube members 57, 58 and 59 will be brought into axially aligned registration at the loading station with the baskets 47 of the successive basket assemblies 39 traveling along the downwardly moving rims of the conveyor chains 27 and 28. In order to effect this synchronous drive of the turret assembly, a stub shaft 60 (Fig. 5) is journalled in suitable bearings adjacent the downwardly moving run of the chain 28 and has a sprocket 61 fixed thereon engaging that chain to rotate the stub shaft. Another sprocket 62 is fixed on the stub shaft 60 to drive a chain 63 which is trained over a sprocket 64 fixed on the shaft 51 of the loading turret assembly, with the various sprockets included in the turret drive being dimensioned to provide the desired rotational speed of the turret.

In accordance with the present invention, pneumatic means are provided in the machine 10 for drawing a container into each loading tube member, when the latter is positioned outside the tower 11 at a container receiving station, and for ejecting the container from the loading tube member and into the registered container receiving basket when the loading tube member is positioned within the tower at the loading station. These pneumatic means are illustrated in detail in Figs. 3, 4 and 5 of the drawings and include a conventional air blower 65, preferably of the radial type, driven by a suitable electric motor 66, and mounted on a supporting bracket 67 at the outside of the tower 11. A T-coupling or pipe section 68 is secured to the inlet end of the blower 65 and extends from that inlet end to the face of disc 50 of the turret assembly at the container receiving station of the latter for communication with the loading tube members 57, 58 and 59 as the latter successively pass by the container receiving station. The containers are brought to the container receiving station of the loading turret 48 by a tube conveyor, generally indicated by the reference numeral 69, which preferably includes a flexible section 70 extending, for example, from the container ejecting station of the container forming machines disclosed in the hereinbefore identified co-pending applications, to a terminal or feeding section 71 curving upwardly and reaching to the face of the disc 49 of the turret, at the container receiving station, to incline the containers, which are conveyed base end first, for axial alignment with the tube members when the latter are at said container receiving station. Thus, when a tube member of the loading turret, for example, the tube member 57 in Fig. 4, is disposed at the container receiving station, outside of the tower, the tube conveyor 69 is placed in communication with the inlet end of the blower 65 through the terminal section 71, the tube member 57 and the T-coupling or pipe 68, so that an air flow is established through these members to draw a container 40 from the terminal or feeding section 71 into the tube member of the turret assembly 48. A cross-pin or stop 72 extends diametrically across each of the loading tube members at the ends thereof opening through the circular disc 50 to limit the movement of the containers into these tube members under the action of the air flow produced by the blower 65.

Since the flow of air through the loading tube members to the blower is interrupted during movement of the loading tube members to and from the positions of alignment with the confronting open ends of the terminal or feeding section 71 and the T-coupling or pipe 68, a by-pass pipe 73 extends from a branch on the section 71 to the third leg of the T-coupling 68 and has a flap valve 74 therein, which is spring urged to closed position, and opens to permit air flow through the by-pass from the conveyor 69 to the inlet of the blower when the flow through the successive tube members of the loading turret is interrupted. Thus, a substantially continuous air flow is maintained through the tube conveyor towards the container receiving station to propel the containers to that station. In order to maintain the inlet side of the air system in a closed condition, even when the loading tube members of the turret are only partially displaced from the container receiving station, similar apertured face plates 75 and 76 (Fig. 13) are secured at the open ends of the feeding section 71 and the T-coupling 68, respectively, to seal or close that portion of the partially displaced tube member which is outside the confines of the related opening in either the feeding section or T-coupling.

The air flow from the outlet end of the blower 65 is utilized for projecting the container from the loading tube member into a basket when the tube member reaches the loading station within the tower 11. For this purpose a conduit 77 (Figs. 3 and 5) extends into the tower 11 parallel to the turret shaft 51 and with the inner end opening against the face of the turret disc 50 at the loading station. A pipe branch 78 extends from the conduit 77 and connects to the outlet of the blower 65. Thus, when the tube member carrying a container arrives at the loading station, for example, the tube member 58 in Fig. 5, it is aligned with the open end of the conduit 77 to receive the air blast from the latter so that the container is thereby projected axially into the basket then at the loading station. Since the end of the conduit 77 facing the turret is closed by the disc 50 when no one of the loading tube members is positioned at the loading station, a pressure relief valve 79 is pivoted in the opposite end of the conduit 77 and spring urged to closed position, to swing open and permit discharge of air from the outlet end of the blower or pump 65 when the air flow through the opposite end of the conduit 77 is interrupted.

The structure set forth to this point accomplishes the individual loading of each container receiving basket as the latter moves downwardly into the paraffin bath, with the basket being inclined so that the container supported therein enters and leaves the paraffin bath in a manner to promote the efficient filling and draining of the interior of the container. However, the paraffin adhering to the surface of the container as it leaves the paraffin bath is of excessive and uneven thickness, and it is therefore necessary to remove some of this paraffin and achieve a coating of uniform thickness after the withdrawal of the container from the bath. It is apparent that these operations will best be performed if the hardening or setting of the paraffin is delayed, and this can be accomplished by creating a warm column of air at the upwardly moving runs of the conveyor chains 27 and 28. For this purpose, a central wall structure 80 (Fig. 2) is provided between the upwardly and downwardly moving runs of the conveyor chains, with the lower ends of the wall structure 80 dipping down below the level of the paraffin in the dipping tank 12 so that the vertical passageway 81 through which the upwardly moving runs travel is provided with a fluid seal at the bottom to receive the heat emanating from the surface of the bath of molten paraffin. Thus, warmed air will rise in the passageway 81 to maintain the paraffin on the coated containers in a fluid condition. If the heat from the bath of paraffin is not sufficient for this purpose, additional electrical heaters (not shown) may be provided on the central wall structure 80 to supplement this source of heat.

Figure 8:
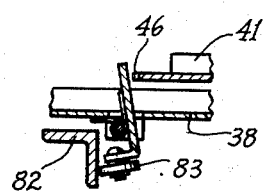
Fig. 8 is a fragmentary sectional view of a portion of the basket assembly showing a latching device forming part of that assembly in released condition.

The removal of the excess paraffin and the evening of the paraffin coat or layer on the container is effected by whirling each basket on the shaft 42 (Fig. 6) which supports the basket platform 41 on the conveyor bracket 38, during the travel of the basket assembly 39 upwardly through the passageway 81. Before such whirling may be effected, it is necessary to actuate the latch member 45 to released position (Fig. 8) to free the platform 41 for rotation relative to the bracket 38. The actuation of the latch member 45 is accomplished by a latch releasing cam track 82 (Figs. 1, 2 and 8) which extends adjacent to the conveyor path along the upper portions of the upwardly and downwardly moving runs and at the top of the conveyor to engage a cam follower roller 83 on the latch member 45 and rock the latter to released condition during the interval when the related basket assembly 39 is disposed on the related portions of the conveyor path. The whirling of the basket during movement along the upper portion of the passageway 81 is effected by a triple whirling chain 84 (Figs. 1, 2 and 9) trained over double sprockets 85 and 86 rotatably mounted adjacent the top of that passageway and just above the starting end of the latch releasing cam track 82, respectively, to position one run of the whirling chain 84 adjacent the conveyor path to engage the sprocket 44 of the bracket assembly in the center course of the triple chain and thus rotate the released basket platform and basket during residence of the related basket assembly 39 on that portion of the conveyor path. The sprocket 85 constitutes the driving sprocket and is rotated at a high rotational speed so that the container in the whirled basket is subjected to a considerable centrifugal force to thereby throw-off the excess paraffin and tend to even the thickness of the paraffin coat or layer.

A similar triple whirling chain 87 is arranged along the upper part of the upper portion of the downwardly moving run of the conveyor and is trained at the top over a double sprocket 88, which sprocket is fixed on one end of a rotatable shaft 89 having the sprocket 85 fixed to the other end thereof, and at the bottom over two courses of a triple sprocket 90 to engage the sprocket 44 of the bracket assembly 39 in the manner heretofore described in connection with the chain 84 and thereby further whirl the related container supporting basket to complete the throwing-off of excess paraffin and then dry the paraffin coating. In order to drive the chains 84 and 87, an electric motor 91 is supported outside the tower 11 (Fig. 1) and has a sprocket 92 fixed on its shaft to drive a chain 93 which extends into the tower and is trained over the third course of the sprocket 90. Baffles or shields 94 are carried by the conveyor chains 27 and 28 between the successive basket assemblies 39 to shield the container in each basket from the adjacent containers so that the paraffin thrown-off one container during whirling thereof will not be deposited on the containers next in line on the conveyor.

Since sudden locking of the platform 41 against rotation immediately after the associated sprocket 44 has been disengaged from the second whirling chain 87 would produce a severe shock, a braking assembly is provided for gradually slowing the rotation of the basket before the basket assembly has reached the end of the latch releasing cam track 82. This braking assembly includes a triple chain 95 trained over top and bottom double sprockets 96 and 97, respectively, which are arranged so that the braking chain 95 engages the sprocket 44 of the basket assembly when the latter sprocket leaves the whirling chain 87 and continues to engage the sprocket 44 until the basket assembly has approached the terminal portion of the cam track 82. At least one of the sprockets 96 and 97 has a friction device of conventional form (not shown) associated therewith to frictionally resist rotation of the sprocket and hence movement of the chain 95.

Figures 11, 12:
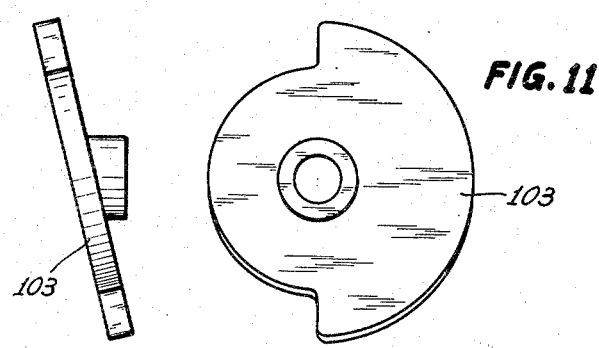
Fig. 11 is an axial elevational view, on an enlarged scale, of a cam member forming a part of the discharging mechanism embodied in the machine of Figs. 1 and 2.
Fig. 12 is an edge view of the cam member shown in Fig. 11.

When the basket assembly 39 passes below the end of the cam track 82, the latch member 45 is freed to spring back to latching position and lock into the notch 46 of the associated platform 41 to thereby hold the latter non-rotatable in the original position relative to the supporting bracket 38. With the basket 47 reestablished in its non-rotatable position, it is now conditioned to have the coated container discharged therefrom. A discharging device, generally indicated by the reference numeral 98 (Figs. 1, 3 and 5) is located at a discharging station to the side of the downwardly moving run of the conveyor between the end of the cam track 82 and the container loading station. The device 98 includes a pusher plate 99 mounted on the end of a stem 100 which is adjustably carried at one end of a pivoted rock arm 101 swingable laterally in a plane parallel to the plane of the downwardly moving run of the conveyor so that the pusher plate moves, from the side, toward and away from the mouth ends of the containers in the baskets on the conveyor. A spring 102 (Fig. 5) is connected to the rock arm 101 to continuously urge the latter to pivot in the direction for moving the pusher plate 99 axially against the mouth end of a container carried by the basket assembly at the discharging station so that the container is pushed, base end first, out of its supporting basket. The movement of the pusher plate to the discharging position is timed by a wobble cam plate 103 (Figs. 5, 11 and 12) fixed on the shaft 60 for movement in synchronism with the operation of the conveyor chains and the loading turret assembly and engageable with a cam follower roller 104 on the end of rock arm 101 remote from the pusher plate stem. As seen in Fig. 11, the cam plate 103 is formed with a radially enlarged peripheral portion, extending over approximately 180°, which alone is engageable with the cam follower roller 104, so that, when the roller 104 rides off that radially enlarged peripheral portion, the arm 101 is suddenly released to be moved abruptly by the spring 102 in the container discharging direction. Thus, the pusher plate 99 moves sharply against the mouth end of the container at the discharging station to jar the container loose from its supporting basket. An inclined chute 105 extends from the discharging station, at the side of the conveyor opposite to the location of the device 98, to the outside of the tower 11 for receiving the containers as the latter are removed from the successive baskets and for carrying the removed containers to a location for use. For example, the chute 105 may communicate with a conveyor for transporting the coated containers to a filling machine or merely to a location for storage.

After the coated containers are removed from the successive baskets at the discharging station, such baskets are again conditioned to successively receive uncoated containers from the loading turret assembly 48 at the loading station and to carry such uncoated containers through a repeated cycle for applying a uniform coating or layer of paraffin thereto.

While we have illustrated and described a preferred embodiment of the invention, it is to be understood that we do not wish to be limited to this precise embodiment, and that obvious changes and modifications may be made therein by one skilled in the art without departing from the spirit or scope of the invention which is intended to be defined in the appended claims.

What is claimed is:

1. A machine for coating containers of the described character; said machine comprising a housing, a reservoir in said housing for containing a bath of the coating material, conveyor means in said housing including a plurality of spaced apart basket members each formed to axially receive a container for carrying containers into and out of said reservoir, a rotatable turret extending into said housing from the outside of the latter and including two concentric, axially spaced apart, circular end plates having spaced openings therein and circumferentially spaced apart loading tube members extending between said end plates and opening at their opposite ends at related openings of said end plates, each loading tube member being in axial alignment with a basket when said loading tube member and said basket are simultaneously disposed at a location within said housing, means for driving said turret in synchronism with the movement of said conveyor means so that the loading tube members register with the successive baskets at said location within the housing, air pumping means having an inlet and an outlet, first conduit means extending from the inlet of said pumping means to a location outside of said housing to there open at one end of each loading tube member successively positioned at said location outside of the housing, a tube conveyor for carrying containers to said location outside of the housing and opening at the other end of each loading tube member successively positioned at said location outside of the housing so that an air flow is produced through the successive loading tube members, when positioned at said location outside of the housing, to draw a container from said tube conveyor into a loading tube member aligned with the latter, a by-pass conduit communicating said first conduit with said tube conveyor, a valve in said by-pass conduit which is spring urged in the direction toward said tube conveyor to a closed position and is adapted to open to permit air flow from said tube conveyor to said first conduit during the movement of said loading tube members to and from said location outside of the housing so that a continuous air flow is maintained through said tube conveyor for transporting containers to said location outside of the housing, and pneumatic means operative to eject the containers from the successive loading tube members at said location within the housing and into the baskets there aligned with the loading tube members.

2. A machine for coating containers of the described character as set forth in claim 1; wherein said pneumatic means includes a second conduit extending from the outlet of said air pumping means to said location within the housing to open at said one end of each loading tube member as said tube members are successively positioned at said location within the housing to thereby produce an air flow through the loading tube member at said location within the housing for projecting the container therefrom.

3. A machine for coating containers of the described character as set forth in claim 2; wherein said second conduit is formed with a blow-out opening, a blow-out valve adapted to close said blow-out opening, and spring means acting on said blow-out valve to continuously urge the latter to closed position, said valve being mounted to be opened by excessive pressure in said second conduit during the movement of said loading tube members to and from said location within the housing.

4. A machine for coating containers having an open end; said machine comprising a reservoir for containing a bath of fluid coating material, conveyor means guided for movement along runs extending into and out of said reservoir and having container receiving basket assemblies rotatably mounted thereon at longitudinally spaced locations, latch means for each of said basket assemblies operative to normally hold the latter non-rotatable in a predetermined position relative to said conveyor means, latch releasing means adjacent a portion of said run extending out of said reservoir and operative to release the latch means for the basket assembly moving along said portion of the run to free said basket assembly for rotation, and cooperative means extending along said portion of the run and on each of said basket assemblies for engagement when the released basket assembly is moving along said portion of the run to rotate the basket assembly and thereby centrifugally remove the excess coating material from the container in the rotated basket assembly.

5. A machine for coating containers having an open end as set forth in claim 4; wherein said reservoir opens upwardly and said runs extend vertically into and out of said reservoir, and including means for supplying the coating material to said reservoir, valve means interposed in said supplying means for maintaining the level of the coating material in said reservoir constant, means for heating the coating material in said reservoir, a housing enclosing said reservoir and said runs of the conveyor, and a central housing wall disposed between said runs and extending at its lower end below the constant level of the coating material in said reservoir to cooperate with said housing in defining a passageway around said run extending out of the reservoir, which passageway is fluid sealed at its lower end to contain the air heated at the surface of the bath of coating material so that said basket assemblies in moving along said passageway pass through a column of heated air to thereby delay the cooling of the coating material on the containers.

6. In a machine for coating bottle-shaped paper containers each having an open mouth end on a neck portion of frusto-conical form and a contiguous cylindrical body portion; a conveyor moving along a closed path, a plurality of basket assemblies disposed on said conveyor at longitudinally spaced locations, and means mounting each of said basket assemblies on said conveyor for rotation in a plane parallel to the plane of movement of the portion of said conveyor on which the respective basket assembly is mounted, each of said basket assemblies being formed to axially receive a bottle-shaped paper container, with the mouth end foremost, and with the center of mass of the container disposed radially outward relative to the axis of rotation of said basket assembly so that, when the latter is rotated, the supported container is whirled with the open mouth end thereof following an orbital path and the resulting centrifugal force acts axially of the container.

7. In a machine for coating bottle-shaped paper containers each having an open mouth end on a neck portion of frusto-conical form and a contiguous cylindrical body portion; the combination according to claim 6, wherein each of said basket assemblies includes two parallel spaced apart container supporting rings of different diameter, the smaller of said rings having a diameter less than the diameter of the cylindrical body portion of the container to be supported but greater than the diameter at the mouth end of the latter to thereby receive the neck portion of the container and limit axial movement of the container in the direction of the mouth end of the latter and the larger of said rings having a diameter sufficient to receive the body portion of the container therein, so that, when the basket assembly is rotated, the centrifugal force acting on the container tends to drive the latter into more secure engagement with its supporting rings.

8. A machine for coating paper containers; said machine comprising a reservoir for containing a bath of coating material, a continuous conveyor moving along a closed path having vertical runs extending into and out of said reservoir, a plurality of container receiving members mounted rotatably on said conveyor at locations spaced along the length thereof, latch means engageable with each of said container receiving members to normally lock the latter against rotation relative to said conveyor in positions in which the mouth ends of the containers received therein trail the remainder of the containers relative to the direction of movement of the conveyor, means located adjacent the lower portion of the run of said conveyor extending into said reservoir and operative to deposit a container in each container receiving member as the latter passes thereby, means disposed along the upper portion of each vertical run of said conveyor operative to release said latch means and to whirl the container receiving members during movement of the latter along said upper portions, means disposed along an intermediate portion of the run of said conveyor extending into said reservoir operative to brake the rotation of said container receiving members after movement of the latter off said upper portion of the run extending into said reservoir, means located adjacent said run extending into said reservoir between said container depositing means and said braking means and operative to remove the container from each container receiving member as the latter moves by said container removing means.

9. A machine for coating paper containers as set forth in claim 8; wherein each of said container receiving members has a driving sprocket fixed thereto for rotation with the related container receiving member, and each of said whirling means includes a chain mounted for movement along a closed path having a run extending parallel to the related portion of the path of said conveyor for engagement with said driving sprocket affixed to the successive container receiving members as the latter move along said related portions of the conveyor path.

10. A machine for coating paper containers as set forth in claim 9, wherein said braking means includes a continuous chain, sprocket means supporting said continuous chain so that the latter is movable along a closed path having a run extending parallel to said intermediate portion of the run of the conveyor extending into said reservoir for engagement with the driving sprocket of each container receiving member as the latter moves along said intermediate portion, and means acting on said sprocket means for yieldably resisting movement of the latter.

11. A machine for coating paper containers as set forth in claim 8; including a housing enclosing said conveyor and said reservoir; and wherein said container depositing means includes a loading turret having loading tube members thereon and mounted for rotation so that said loading tube members are successively movable between a container receiving location outside of said housing and a location within said housing adjacent the container receiving members passing thereby, means driven by said conveyor for rotating said loading turret so that the loading tube members thereof register successively with said container receiving members at said location within the housing, and pneumatic means operatively coacting with said loading turret to draw containers into said loading tube members successively positioned at said container receiving location and to eject the containers from said loading tube members and into said container receiving members at said location within the housing.

12. A machine for coating paper containers as set forth in claim 8; wherein said latch means includes a latch lever swingable laterally of the path of said conveyor, spring means urging said latch lever into locking engagement with the related container receiving member, and a cam follower member on said latch lever; and wherein said latch releasing means includes a cam track engageable with said cam follower members on the latch levers for swinging the latter out of locking engagement with the related container receiving members.

13. A machine for coating paper containers as set forth in claim 8; including laterally extending shield members projecting from said conveyor between said container receiving members so that coating material removed from the container supported in one of said container receiving members during the whirling of the latter will not be deposited on the containers in the adjacent container receiving members.

References Cited in the file of this patent

UNITED STATES PATENTS

| | | |
|---|---|---|
| 714,865 | Collis et al. | Dec. 2, 1902 |
| 1,042,914 | Heyl | Oct. 29, 1912 |
| 1,151,636 | Weis et al. | Aug. 31, 1915 |
| 1,192,604 | Burton | July 25, 1916 |
| 1,708,429 | Mueller et al. | Apr. 9, 1929 |
| 2,044,077 | Jones | June 16, 1936 |
| 2,133,214 | Scott | Oct. 11, 1938 |
| 2,289,763 | Earp | July 14, 1942 |